United States Patent [19]

Vitzthum et al.

[11] 4,167,589
[45] Sep. 11, 1979

[54] METHOD FOR THE MANUFACTURE OF CAFFEINE FREE BLACK TEA

[76] Inventors: Otto Vitzthum, Bremen; Peter Hubert, Bremen-Lesum, both of Fed. Rep. of Germany

[21] Appl. No.: 791,097

[22] Filed: Apr. 26, 1977

Related U.S. Application Data

[63] Continuation of Ser. No. 646,779, Jan. 6, 1976, abandoned, which is a continuation of Ser. No. 461,056, Apr. 15, 1974, abandoned, which is a continuation of Ser. No. 258,508, Jun. 1, 1972, abandoned.

[30] Foreign Application Priority Data

Jun. 1, 1972 [DE] Fed. Rep. of Germany ....... 2127642

[51] Int. Cl.² .............................................. A23F 3/00
[52] U.S. Cl. ..................................... 426/312; 426/318; 426/319; 426/386; 426/427; 426/428; 426/424; 426/478
[58] Field of Search ............... 426/427, 428, 386, 424, 426/478, 312, 318, 319

[56] References Cited

U.S. PATENT DOCUMENTS

| | | | |
|---|---|---|---|
| 1,640,648 | 8/1927 | Cross | 426/354 |
| 3,477,856 | 11/1969 | Schultz | 426/424 |
| 3,532,506 | 10/1970 | Rey et al. | 426/435 X |
| 3,806,619 | 4/1974 | Zosel | 426/427 X |
| 3,823,241 | 7/1974 | Patel et al. | 426/386 |
| 3,843,824 | 10/1974 | Roseluis et al. | 426/386 |
| 3,879,569 | 4/1975 | Vetzheem et al. | 426/427 |

FOREIGN PATENT DOCUMENTS

| | | | |
|---|---|---|---|
| 82633 | 6/1971 | German Democratic Rep. | 426/427 |
| 2005293 | 10/1972 | Fed. Rep. of Germany | 426/428 |
| 43128 | 5/1938 | Netherlands | 426/386 |
| 1057911 | 2/1967 | United Kingdom | 426/386 |
| 1106468 | 3/1968 | United Kingdom | 426/386 |

*Primary Examiner*—Joseph M. Golian
*Attorney, Agent, or Firm*—Sprung, Felfe, Horn, Lynch & Kramer

[57] ABSTRACT

A caffeine free black tea product is produced by an extraction procedure with a supercritical gas such as carbon dioxide in which first the aromatic content of the tea is extracted with dry gas, then the caffeine content is extracted with wet gas, and finally the decaffeinated tea is reimpregnated with the aromatic content.

19 Claims, 1 Drawing Figure

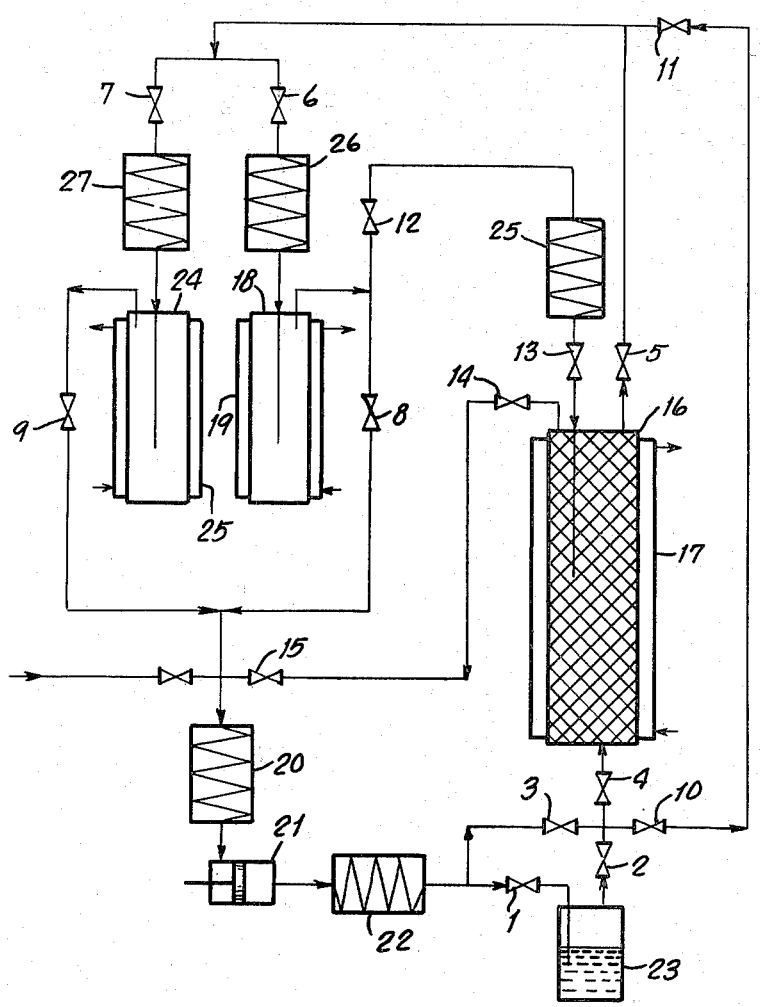

METHOD FOR THE MANUFACTURE OF CAFFEINE FREE BLACK TEA

This application is a continuation of Ser. No. 646,779, filed Jan. 6, 1976, now abandoned, which is a continuation of Ser. No. 461,056, filed Apr. 15, 1974, now abandoned, which is a continuation of Ser. No. 258,508, filed June 1, 1972, now abandoned.

BACKGROUND OF INVENTION

Several methods for the decaffeination of tea are known, dealing in part with the manufacture of caffeine free tea leaves, and in part with the manufacture of caffeine free, soluble tea extract powders. In contrast to the decaffeination of coffee, which occurs almost exclusively in the raw beans, the decaffeination of tea must be accomplished, in areas where the tea plant is not grown, on a dried and fermented product which, in addition, is also extremely sensitive with respect to its aroma. It is significant that only a few manufacturers offer caffeine free tea. One of the reasons is primarily the aroma problem which cannot be solved satisfactorily with any of the previously known methods.

For example, a decaffeination procedure is described in Swiss Pat. No. 164,535 in which an aqueous tea extract free of caffeine was produced by means of percolation with a caffeine-solvent immiscible with water, after which the previously extracted tea was impregnated with the now caffeine free, concentrated extract and subsequently dried. The aqueous tea extract was made slightly ammoniacal in order to prevent precipitation from separating.

In another method (German Pat. No. 196,835) the aromatic substances were first removed from the tea by means of petroleum ether. The tea was then moistened, ammonia was conducted through it to crack the caffeine-complex salts, and the caffeine was subsequently extracted with solvents. After drying the tea, the aromatic substances which were initially removed from it with the petroleum ether were again added to the tea.

A similar method is described in the French Pat. No. 791,055 in which the aromatic substances are extracted by means of a solvent having a low boiling point, such as dichlorethylene, the extraction of the caffeine being accomplished by a solvent having a higher boiling point, such as carbon tetrachloride, after a treatment with alcoholic ammonia solution. In another variation of the method, the aromatic substances and the caffeine are removed from the tea at the same time by a solvent mixture and, after fractionating the extract, the aromatic substances are reincorporated into the tea.

In another method (German Disclosure No. 1,807,308) an aqueous tea extract is produced after removing the caffeine with organic solvents. Since aromatic ingredients also dissolve in this process, they are recovered separately from the organic solvents and subsequently added to the decaffeinated tea extract. The result is an instant tea.

All of the previously known methods have several drawbacks. Either one has to work, among others, with ammonia or sulfur dioxide in a doubtful manner with respect to the food laws to crack the caffeine-complex salts in the tea leaf, for instance; or the aromatic substances must be recovered from a solvent fraction, in which process it is generally not possible, due to the nature of the usually oily aromatic ingredients, to remove all solvent residues from them completely; or, where this is accomplished, it is associated with a considerable less, in particular of the volatile aromatics.

The objective of the present invention is a method for the manufacture of caffeine free black tea leaves as well as of caffeine free instant tea, while avoiding the disadvantages of the hitherto known methods.

THE INVENTION

A process has now been discovered for the production of caffeine free black tea with substantially the full original aroma or aromatic content, which substantially alleviates the problem of the prior art and comprises the steps of:

1. Extracting the tea leaves with a dry non-toxic extraction solvent while maintaining the solvent in the supercritical state with respect to temperature and pressure to extract the aromatic content of the tea and leave a tea residue,
2. Separating the aromatic content from the extraction solvent by reducing the pressure below the critical pressure,
3. Extracting the tea residue with a moist supercritical gas which may be, and usually is, the same solvent employed in Step 1 to remove the caffeine, and
4. Redissolving the aromatics separated in Step 2, utilizing a supercritical gas which may be, and usually is, the same gas employed in Step 1 and separating the aromatics from the gas by liquifying it in the presence of the substantially caffeine free tea residue of Step 1, thereby to impregnate the residue with the original aromatic content.

The preferred solvents are selected from the group consisting of cabon dioxide; saturated and unsaturated hydrocarbons containing up to about three carbon atoms; nitrous oxide; saturated and unsaturated halogenated hydrocarbons containing up to about three carbon atoms, suitably those in which at least fifty percent of the replaceable hydrogens of the parent hydrocarbon have been replaced with halogen atoms, usually fluorine or chlorine; sulfur hexafluoride; and mixtures of these. Carbon dioxide is by far the preferred solvent since the use of other gases may require very careful purification procedures.

It is noted that, especially with respect to the aromatics, an extraction with gaseous or liquefied substances of low boiling point, that is in subcritical state, is also possible, as described in the British Pat. No. 1,106,468 utilizing gaseous and liquid carbon dioxide. Owing to the poor dissolving power of the gaseous carbon dioxide, however, the extraction must be carried out at relatively high temperatures ranging from 80° to 110° C., and even a second extraction with liquid carbon dioxide does not completely extract the aromatics. In contrast thereto it was found, according to this invention, that the dissolving power for the aromatic ingredients increases greatly during the transition into the supercritical state and that, consequently, the extraction takes place faster and more completely than with subcritical gases or liquids.

"Supercritical" with respect to the temperature of carbon dioxide means a temperature above 31.6° C. In practice temperatures from about 40° C. to 100° C. may be used. Preferably, with a view to the least possible thermal stress on the material, temperatures from 40° C. to 60° C. are utilized for the aroma extraction, while higher temperatures may be applied for the caffeine removal.

"Supercritical" with respect to the pressure of carbon dioxide means above 74.3 atm. abs. In practice, during the aroma removal, a pressure above 100 atm. abs. and preferably from 200 to 400 atm. abs. During decaffeination the pressure utilized is also above 100 atm. abs., preferably from 200 to 250 atms. abs.

The corresponding critical data for other gases employed in the invention are readily determined from literature.

The presently preferred procedure for carrying out the invention can be easily understood by reference to FIG. 1. For convenience the process will be explained with reference to the preferred extractant, carbon dioxide.

In the process dry, supercritical carbon dioxide is conducted through pressure pipe or tank 16, fitted with a temperature control jacket 17. The tank contains moist tea, usually tea leaves. The gas during this first step picks up substantially all of the aromatics in the tea together with some water. In this step valves 3, 4, 5, 6 and 8 are open and all others are closed. The gas is conducted through heat exchanger 26 to tank 18 also fitted with a temperature control jacket 19 where the pressure is brought to subcritical while the temperature is maintained above the critical temperature, suitably the same temperature as in tank 16, whereupon the aromatics separate from the solvent. The gas relieved of the aromatics now passes through heat exchanger 20 where it is liquefied, pump 21 and heat exchanger 22, where it is returned to supercritical conditions. Pump 21 may be replaced with a compressor.

For the dissociation of the solvent-solute system and separation of the aromatic content it is also possible by appropriate change in conditions to liquify the gas in tank 18. However, the aromatics are partly soluble in carbon dioxide so that gaseous carbon dioxide must be removed above the liquid phase in tank 18. The supercritical medium returns to tank 16 substantially free of all but the most volatile of the aromatics. In this manner substantially all of the aroma causing ingredients are removed from the tea to leave a substantially odorless tea residue in tank 16. The residue still contains caffeine.

The first extraction and separation steps continue for a period of time which may vary within wide limits depending upon such factors as the size of the system and the selected process parameters. Normally, however, an extraction period is from about 2 to 10 hours.

At the end of the extraction period combining Steps 1 and 2, the system is shut down and water filled tank 23 is cut into it. Valves 1, 2, 4, 5, 7 and 9 are opened, and all others are closed. Circulation is restarted and the supercritical gas flows through the water taking along a part of it and thus moistening the tea. The moist gas selectively extracts the caffeine from the tea residue, and it is precipitated in tank 24 which is equipped with temperature control jacket 25 by adjusting the carbon dioxide to a subcritical condition with respect to pressure while keeping the temperature above the critical temperature, suitably at the same temperature as in tank 16. By thus maintaining the gas in the gaseous state the caffeine precipitates with little or no water, so that the water content of tank 23 remains essentially constant throughout the decaffeination step. Tank 24 is downstream of heat exchanger 27 used for temperature control.

In both extraction steps and in the later impregnation step either pressure relief or temperature increase can be employed to dissociate the solvent-solute systems and effect precipitation. The following summarizes the various combinations of pressure and temperature which may be employed.

| | | |
|---|---|---|
| Case 1: | $P_2 < P_{crit.} < P_1$. | Preferred absolute values: |
| | $t_1 \geq t_2 > t_{crit.}$ | $P_1 = 200\text{--}400$ atm. abs. |
| | | $t_1 = 40\text{--}60°$ C. |
| | | $P_2 =$ at least 5 atm. below $P_{crit.}$ |
| | | $t_2 =$ at least 5° C. above $t_{crit.}$ |
| | Application: Removal of aroma and caffeine | |
| Case 2: | $P_2 < P_{crit.} < P_1$ | Preferred absolute values: |
| | $t_2 < t_{crit.} < t_1$ | $P_1, t_1, P_2 =$ see Case 1 |
| | | $t_2 =$ at least 5° C. below $t_{crit.}$ |
| | Application: Removal of aroma and caffeine aroma impregnation (reversed polarity) | |
| Case 3: | $P_2 = P_1 > P_{crit.}$ | Preferred absolute values: |
| | $t_2 > t_1 > t_{crit.}$ | $P_2, P_1, t_1 =$ see Case 1 |
| | | $t_2 = 80\text{--}150°$ C. |
| | Application: mainly caffeine removal | |
| Case 4: | $P_2 < P_{crit.} < P_1$ | Preferred absolute values: |
| | $t_2 > t_1 > t_{crit.}$ | $P_1, P_2, t_1 =$ see Case 1 |
| | | $t_2 =$ see Case 3 |

APPLICATION: MAINLY CAFFEINE REMOVAL

The four cases listed can be carried out with a liquid-gas pump or with a compressor according to FIG. 1, the heat exchangers changing their functions, however. Which one of the possibilities is selected depends upon procedural or economic contingencies. How pure the caffeine obtained will be depends also upon the quality of the preceding aroma extraction. In general the caffeine is obtained as a weakly yellow powder with a caffeine content of approximately 95 to 97%. The remainder is not completely extracted aroma.

One special feature of this tea decaffeination method is that all other ingredients of the tea giving it flavor and color, such as tannic substances, tea flavins and tea rubigenes are not extracted along with the caffeine, as has been determined by analysis of the extract and prepared tea.

After the conclusion of the second treatment phase the still moist tea is subjected to a conventional, careful vacuum drying operation at a temperature up to a maximum of about 50° C. This does not change the color of the material. After the natural moisture content has been approximately reached, tanks 23 and 24 are closed, and tank 18 is opened. The aromatics contained in tank 18 are now applied to the tea in pipe 16 by reversal of the circulation. The valves 3, 10, 11, 6, 12, 13, 14, 15 are opened, all others closed. This means that the supercritical carbon dioxide absorbs the aromatics, and the thus laden gas flow, after liquefaction in heat exchanger 25, is introduced into tank 16. This again causes dissociation, and the tea is impregnated with the aromatics. The preferred operating temperature here is from about −10° C. to 10° C. Care is taken that the gaseous and almost aroma free, subcritical carbon dioxide is drawn off above the liquid phase containing the tea, again liquefying it in heat exchanger 20. The pump then pumps the gas through heat exchanger 22, where it is brought to supercritical conditions, into tank 18, where aroma is absorbed again and so on.

Finally, the tea in pipe 16 is freed from carbon dioxide by slow evaporation. A compressor may be employed in place of the liquid pump, thus obviating the liquefaction.

The resulting product is a tea whose caffeine content is below 0.1% in dry condition. The operating time for the decaffeination phase may be varied as in the aroma extraction and normally is from about 2 and 10 hours. Potable tea prepared from the extracted product of this invention differs from untreated tea only in the difference in caffeine. It is no different in color when poured or in its other properties, particularly its aroma.

Another utility for the process of the invention is in producing, as described above, a decaffeinated tea for the manufacture of instant tea. For this purpose the decaffeinated tea, without further drying, of course, is extracted with water in a known manner, and an instant product is produced by spray- or freeze-drying. The dried product is impregnated with the previously removed aroma in the same manner as described above for the tea leaves. The method may also be modified in that an aromatic solution in liquid carbon dioxide is produced first. It is then poured onto the instant powder, and the carbon dioxide is slowly evaporated. The result is a caffeine free instant tea containing a maximum of 0.25% caffeine and showing the same pouring behavior as the presently available instant products containing caffeine, except that it is extremely aromatic compared to the latter.

The following non-limiting examples are given by way of illustration only.

The conditions $P_1$, $t_1$ given in the examples relate to pressure and temperature in tank 16, the conditions $P_2$, $t_2$ to those in tanks 18 and 24.

EXAMPLE 1

As described above, the aroma was removed first from 1 kg of Java tea in the first extraction phase lasting 3 hours at $P_1=400$ atm. abs. and $t_1=45°$ C., $P_2=65$ atm. abs., $t_2=45°$ C. Then, in the second phase, tank 23 containing 1 liter of water was included in the circulation, and the caffeine separated in tank 24. Conditions: Duration=5 hours, $P_1=250$ atm. abs., $P_2=65$ atm. abs., $t_1=+50°$ C., $t_2=+50°$ C. After redrying the moist tea at $+50°$ C. under vacuum to regain its natural moisture content, the aroma impregnation was then carried out. Conditions: Duration=2 hours, $P_1=45$ atm. abs., $P_2=300$ atm. abs., $t_1=+10°$ C., $t_2=+40°$ C. Finally, the liquid carbon dioxide contained in the pipe 16 and in the tea therein was blown while maintaining the temperature above $-10°$ C.

RESULT

A tea was obtained which did not differ from untreated material in its aroma, color, poured condition and flavor.

| Results of analyses: Analyses | Untreated tea | Decaffeinated tea |
|---|---|---|
| Moisture, % | 7.26 | 6.8 |
| Solubles in petroleum ether, % | 0.32 | 0.30 |
| Ash, 600° C., % | 5.15 | 5.17 |
| Aqueous extract, % | 38.25 | 35.50 |
| Caffeine, % | 2.99 | 0.07 |
| (Using the Levine procedure) | | |
| Tannic substances, % | 9.98 | 10.5 |
| Tea flavin, 380 nm, % | 0.34 | 0.30 |
| Tea flavin, 460 nm, % | 0.27 | 0.22 |
| Extractable tea rubigenes, % | 8.90 | 8.26 |

The caffeine obtained was a yellowish powder containing 5% water and 92% caffeine.

EXAMPLE 2

10 kg Java tea were processed as follows:
First phase, aroma removal: Duration=4 hours at $P_1=400$ atm. abs., $t_1=+45°$ C.; $P_2=65$ atms. abs., $t_2=+45°$ C. Second phase, decaffeination: Duration=9 hours at $P_1=240$ atm. abs., $t_1=+50°$ C.; $P_2=65$ atm. abs., $t_2=+50°$ C.

The tea was then subjected to an aqueous extraction, and the extract solution was processed into a spray extract powder. This material was introduced into tank 16:

Third phase, aroma impregnation: Duration=4 hours at $P_1=45$ atm. abs., $t_1=+10°$ C.; $P_2=350$ atm. abs., $t_2=45°$ C.

RESULT

A tea extract powder was obtained which had, in contrast to the known material, a natural tea aroma and did not differ in all other values from the untreated product, except for its caffeine content which was only 0.25%.

What is claimed is:

1. A process for the production of caffeine free black tea which comprises the steps of:
   a. Extracting tea leaves with a dry extraction solvent gas having selective dissolving capacity for the aromatic component, and which is maintained in the supercritical state with respect to temperature and presure to extract the aromatic content of the tea and leave a tea residue,
   b. Separating the aromatic content from the extraction solvent,
   c. Extracting the tea residue with a moist extraction solvent gas having selective dissolving capacity for the caffeine, and which is supercritical with respect to temperature and pressure to remove the caffeine,
   d. Redissolving the aromatics separated in Step (b) utilizing an extraction solvent gas which is supercritical with respect to temperature and pressure and separating the aromatics from the gas in the presence of the substantially caffeine free tea residue, thereby to impregnate the residue with the original aromatic content.

2. A process according to claim 1 wherein the substantially caffeine free tea residue is extracted with water prior to impregnation with the aromatics; the aqueous extract is spray dried to produce a dry powder which is thereafter impregnated with the aromatics in accordance with step (d).

3. A process as in claim 1 wherein the temperature in Step (b) is above the critical temperature of the extraction gas and the separation is effected by reducing the pressure.

4. A process as in claim 1 wherein the temperature in Step (b) is below the critical temperature of the extraction gas.

5. A process as in claim 1 wherein the selected gas in each of steps (a), (c), and (d) is carbon dioxide.

6. A process as in claim 1 wherein the selected gas in each of steps (a), (c) and (d) is carbon dioxide and Step (a) is carried out at a temperature of from about 40° C. to 60° C. at a pressure of from about 200 to 400 atmospheres absolute.

7. A process as in claim 1 wherein the selected gas in each of steps (a), (c), and (d) is carbon dioxide and Step (c) is carried out at a temperature of from about 40° C. to 60° C. and a pressure of from about 200 to 250 atmospheres absolute.

8. A process as in claim 1 wherein the selected gas in each of steps (a), (c), and (d) is carbon dioxide and the aromatics are impregnated at a temperature of from about −10° C. to 20° C.

9. A process as in claim 1 wherein the solvent gases are selected from the group consisting of carbon dioxide; saturated and unsaturated hydrocarbons containing up to about three carbon atoms; nitrous oxide; saturated and unsaturated halogenated hydrocarbons containing up to about three carbon atoms; sulfur hexafluoride; and mixtures thereof.

10. A process for the production of caffeine free black tea, which comprises the steps of:
(a) extracting tea leaves with dry extraction solvent gas having selective dissolving capacity for the aromatic content, and which is maintained in the supercritical state with respect to temperature and pressure to extract aromatic content of the tea and leave a dearomatized tea residue.
(b) extracting the tea residue with a moist extraction solvent gas having selective dissolving capacity for the caffeine, and which is in the supercritical state with respect to temperature and pressure to remove caffeine and leave a dearomatized and decaffeinated tea residue,
(c) impregnating a dearomatized and decaffeinated tea residue with aromatic component extracted in step (a).

11. A process as in claim 10, wherein the solvent gas used in step (b) is moist carbon dioxide.

12. A process as in claim 11, wherein the solvent gas used in step (a) is dry carbon dioxide.

13. A process as in claim 12, wherein the temperature in step (a) and step (b) are 40°–100° C. and the pressures in step (a) and step (b) are above 100 atms.

14. Process as in claim 10, wherein a tea extract is produced from the dearomatized and decaffeinated tea residue produced in step (b), and aromatic component produced in step (a) is added to a dearomatized and decaffeinated tea extract.

15. A process as in claim 10, wherein the solvent gases are selected from the group consisting of carbon dioxide; saturated and unsaturated hydrocarbons containing up to about 3 carbon atoms; nitrous oxide; saturated and unsaturated halogenated hydrocarbons containing up to about 3 carbon atoms; sulfur hexafluoride; and mixtures thereof.

16. A process as in claim 1, the separation in step (b) being effected by reducing the pressure, the gas in each of steps (a), (c), and (d) being carbon dioxide, the temperature in step (a) being about 40° to 60° C. and the pressure in step (a) being about 200 to 400 atms., the temperature in step (c) being about 40° to 60° C. and the pressure in step (c) being about 200 to 250 atms., and the aromatics are impregnated at about −10° to 20° C.

17. A process as in claim 1, wherein the separation in step (b) is effected by reducing the pressure to below the critical pressure.

18. A process for extracting aromatic constituents and caffeine from tea, which comprises extracting tea leaves with a dry extraction solvent gas having selective dissolving capability for the aromatic component, and which is maintained in the supercritical state with respect to temperature and pressure to extract the aromatic content of the tea and leave the dearomatized residue; recovering the aromatic content; and extracting the tea residue with a moist extraction solvent gas having selective dissolving capacity for the caffeine, and which is in the supercritical state with respect to temperature and pressure to remove caffeine.

19. Process according to claim 18, in which said dry extraction solvent gas is dry carbon dioxide and said moist extraction solvent gas is moist carbon dioxide.

* * * * *

UNITED STATES PATENT AND TRADEMARK OFFICE
CERTIFICATE OF CORRECTION

PATENT NO. : 4,167,589
DATED : September 11, 1979
INVENTOR(S) : Otto Vitzthum and Peter Hubert It is certified that error appears in the above-identified patent and that said Letters Patent are hereby corrected as shown below:

Title page, item [30], the priority date is incorrect: "June 1, 1972" should read --June 3, 1971--

Notification of assignment is missing. The same should read:
--Assignee: Studiengesellschaft Kohle m.b.H.
            Mülheim/Ruhr, Fed. Rep. of Germany--

Column 1, line 32, "precipitation" should read --precipitates--

Column 2, line 2, "less" should read --loss--

Column 2, line 29, "liquifying" should read --liquefying--

Column 2, line 34, "cabon" should read --carbon--

Column 3, line 34, "liquify" should read --liquefy--

Column 6, line 32, "presure" should read --pressure--

Signed and Sealed this

Ninth Day of June 1981

[SEAL]

Attest:

RENE D. TEGTMEYER

Attesting Officer        Acting Commissioner of Patents and Trademarks